United States Patent
Rowell (10) Patent No.: US 10,674,354 B2
(45) Date of Patent: Jun. 2, 2020

(54) WIRELESS COMMUNICATION DEVICE, WIRELESS COMMUNICATION SYSTEM AND WIRELESS COMMUNICATION METHOD

(71) Applicant: Rohde & Schwarz GmbH & Co. KG, München (DE)

(72) Inventor: Corbett Rowell, Munich (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 221 days.

(21) Appl. No.: 16/010,737

(22) Filed: Jun. 18, 2018

(65) Prior Publication Data

US 2019/0069167 A1 Feb. 28, 2019

(30) Foreign Application Priority Data

Aug. 30, 2017 (EP) ...................................... 17188464

(51) Int. Cl.
| | |
|---|---|
| *H04L 12/04* | (2006.01) |
| *H04W 12/04* | (2009.01) |
| *H04W 64/00* | (2009.01) |
| *H04L 29/06* | (2006.01) |
| *H04L 9/08* | (2006.01) |

(52) U.S. Cl.
CPC .......... *H04W 12/04* (2013.01); *H04L 9/0819* (2013.01); *H04L 9/0827* (2013.01); *H04L 63/0428* (2013.01); *H04L 63/18* (2013.01); *H04W 64/003* (2013.01); *H04L 63/06* (2013.01); *H04L 2209/80* (2013.01)

(58) Field of Classification Search
CPC ..................................................... H04W 12/04
USPC ........................................................... 380/33
See application file for complete search history.

(56) References Cited

U.S. PATENT DOCUMENTS

| | | | |
|---|---|---|---|
| 2002/0106086 A1 | 8/2002 | Kamiya et al. | |
| 2013/0078923 A1* | 3/2013 | Ekbatani | H04W 8/005 455/41.2 |
| 2017/0229009 A1* | 8/2017 | Foster | G06F 3/011 |
| 2019/0059042 A1* | 2/2019 | Soundararajan | H04L 63/083 |

OTHER PUBLICATIONS

Communication pursuant to Article 94(3) EPC for European Patent Application No. 17 188 464.6, dated Sep. 27, 2019, 6 pages.
Abdelaziz, Amr et al., "On the Security of Angle of Arrival Estimation", Department of Electrical and Computer Engineering, The Ohio State University, Columbus, Ohio, 2016 IEEE Conference on Communications and Network Security (CNS), 978-1-5090-3065-1/16/$31.00 ©2016 IEEE, XP033068138, 9 pages.

(Continued)

*Primary Examiner* — Peter C Shaw
(74) *Attorney, Agent, or Firm* — Westman, Champlin & Koehler, P.A.

(57) ABSTRACT

The present invention provides a wireless communication system using encrypted communication. In particular, the present invention provides a transmission of key data for encrypting or decrypting data by a plurality of independent wire-less transmission channels. Accordingly, encryption or decryption is performed by a combination of the key data transmitted by a plurality of the wireless transmission channels.

12 Claims, 5 Drawing Sheets

(56) References Cited

OTHER PUBLICATIONS

Xiong, Jie et al., "SecureAngle: Improving Wireless Security Using Angle-of-Arrival Information (Poster Abstract)", Computer Communication Review, ACM, New York, NY, US, vol. 40, No. 4, Aug. 30, 2010 (Aug. 30, 2010), XP058346829, 2 pages.
Extended European Search Report for European Patent Application No. 17188464.6, dated Nov. 30, 2017, 9 pages.
Schneier, B. Ed., "Applied cryptography, second edition", Jan. 2, 1996 (Jan. 2, 1996), Applied Cryptography: Protocols, Algorithms and Source Code In C, John Wiley & Sons, New York, [U.A.], pp. 176-177 (2 total pages).

* cited by examiner

WIRELESS COMMUNICATION DEVICE, WIRELESS COMMUNICATION SYSTEM AND WIRELESS COMMUNICATION METHOD

CROSS-REFERENCE TO RELATED APPLICATION

The present application claims priority to European Patent Application No. 17188464.6, filed on 30 Aug. 2017, the content of which is hereby incorporated by reference in its entirety.

TECHNICAL FIELD

The present invention relates to a wireless communication device and a wireless communication system. The present invention further relates to a wireless communication method.

BACKGROUND

Although applicable in principal to any wireless communication system, the present invention and its underlying problem will be hereinafter described in combination with a user equipment and a base station.

In a mobile communication network, a secure communication between a base station and a user equipment may be established by encrypted communication between the base station and the user equipment. The encryption may be based on a pre-shared key provided by the base station.

In such a scenario, it may be possible to spoof a base station by establishing the "fake"-base station. For example, an attacker may establish a base station comprising a baseband unit (BBU) and a remote radio unit (RRU) which are controlled by the attacker. In such a scenario, the attacker may provide a known pre-shared key for establishing a connection between the spoofed base station and the user equipment. Accordingly, the user equipment may not recognize that the spoofed base station is controlled by an attacker.

SUMMARY

Against this background, there is the need to provide a secure wireless communication.

According to aspects of the invention, the present invention provides a wireless communication device, a wireless communication system and a wireless communication method having the features of the independent claims.

Accordingly, it is provided:

A wireless communication device comprising a transceiver and a data processor. The transceiver is adapted to receive key data by a plurality of wireless transmission channels and/or to transmit key data by a plurality of wireless transmission channels. The data processor if adapted to decrypt encrypted data based on a combination of the key data received by the plurality of wireless transmission channels and/or to encrypt data using a combination of the key data transmitted by the plurality of wireless transmission channels.

A wireless communication system comprising the first wireless communication device and a second wireless communication device. The first wireless communication device comprises a first transceiver and a first data processor. The first transceiver is adapted to receive key data by a plurality of wireless transmission channels. The first data processor is adapted to decrypt encrypted data based on a combination of the key data received by each of the plurality of wireless transmission channels. The second wireless communication device comprises a second data processor and a second transceiver. The second data processor is adapted to encrypt data using a plurality of key data. The second transceiver it is adapted to transmit each of the plurality of key data by one of a plurality of wireless transmission channels.

A wireless communication method, comprising the steps of receiving key data by a plurality of wireless transmission channels; and decrypting encrypted data based on a combination of the key data received by each of the plurality of wireless transmission channels.

A wireless communication method, comprising the steps of encrypting data based of a combination of a plurality of key data, and transmitting each of the plurality of key data by one of a plurality of wireless transmission channels.

The present invention is based on the fact that a simple one to one connection between two communication devices may be easily attacked by spoofing one of the communication devices. As explained above, a spoofed base station may established encrypted communication with a user equipment based on a known encryption key.

It is an idea of the present invention to establish at least two wireless transmission channels for exchanging key data. Accordingly, the encryption and decryption of data to be exchanged between two communication partners is performed by using all the key data transmitted by the at least two communication channels. In this way, even if an attacker would establish a single communication channel between a spoofed communication device and a user equipment, the attacker is not aware of the key data of the further communication devices. Thus, the spoofed communication device cannot perform an encryption or decryption of the transmitted communication data. Furthermore, since the key data provided by the spoofed communication device does not relate to the key data of the real communication partners, the user equipment may detect the attack when considering the encrypted data provided by the spoofed communication device in combination with the other key data for decrypting the communication data. Accordingly, the user equipment can easily recognize an attempt for attacking the communication path.

By establishing more than one communication channels between the two communication devices, and providing the key data for establishing encrypted communication between the communication partners by each of the communication channels, it is no longer possible that a single communication device can spoof a communication partner and intercept a communication.

The key data provided by the plurality of wireless transmission channels may be any kind of key data. For example, it may be possible to generate one key and to divide this generated key into a plurality of parts. In particular, the number of parts may correspond to the number of wireless transmission channels. Accordingly, only a single part of the key may be transmitted by each of the transmission channels. After receiving all parts of the key, the received parts may be put together in order to obtain the whole key for encrypting/decrypting data. However, it is understood that the present invention is not limited to a single key or to dividing one key into a number of parts corresponding to the number of transmission channels. Moreover, it may be also possible to generate a number of more than one keys and to perform a nested encryption/decryption based on the number of keys. In this case, one of the keys for performing a nested encryption/decryption may be transmitted by each of the established wireless transmission channels.

Furthermore, the key data transmitted by the plurality of wireless transmission channels are not limited to only a single encryption/decryption. Moreover, if more than one encryption/decryption processes are performed by the communication devices, separate data may be transmitted by the wireless transmission channels for each encryption/decryption process. For example, first key data may be exchanged for encrypting/decrypting control data, and second key data may be exchanged for encrypting/decrypting main data. However, it is understood that the present invention is not limited to the above-mentioned examples. Moreover, any other kind of key data may be also exchanged by the plurality of transmission channels.

The encryption/decryption process may be any kind of encryption/decryption process. For instance, the encryption/decryption may be based on pre-shared key (PSK). Accordingly, the key data may be exchanged between the communication partners in advance, and subsequently the further communication is encrypted/decrypted based on the respective key data. It is understood, that the encryption underlying the communication between the communication partners may be based on symmetric keys as well as asymmetric keys. In particular, the encryption/decryption between the communication partners may be based, for example, on the encryption schemes already establish for wireless communication such as LTE or LTE-A. However, it is understood, that the encryption/decryption between the communication partners may not be limited to the above-mentioned examples. Any other algorithm or scheme for encrypting/decrypting communication data may be also established.

The transceiver of the communication device may be any kind of transceiver for establishing a plurality of wireless transmission channels. In particular, the transceiver may comprise an antenna or an antenna system including a plurality of antenna elements for emitting wireless signals and/or receiving wireless signals. In particular, the antenna or the antenna system may emit or receive wireless radiofrequency signals. The antenna or the antenna elements may be coupled to at least one signal processing device for demodulating the received signals to obtain the data included in the wireless signals. The signal processing device may also generate signals which may be emitted by the antenna or antenna system. For this purpose, the signal processing device may be electrically coupled with the antenna or antenna system. In particular, a connector of the antenna or antenna system may be electrically connected with a terminal of the signal processing device. The signal processing device may comprise components such as mixers, analog to digital converters, digital to analog converters, modulators or any other kind of electrical components which may be appropriate for generating signals to be emitted by the antenna and/or for demodulating the received wireless signals which are received by the antenna. Between the components of the transceiver and an input port or and output port analog elements, like e.g. filters comprising resistors, capacitors and inductors, or the like may be provided.

Furthermore, the transmitter may be communicatively coupled with the data processor in order to receive data to be transmitted by the transceiver and/or to output the data which are obtained by demodulating the received wireless signals.

The data processor may be any kind of processor which is appropriate for encrypting or decrypting data. For example, the data processor may, e.g., comprise a general purpose processor with corresponding instructions. Further, the data processor may comprise interfacing elements that are coupled to the processor, receive the data from the transceiver and provide the received data to the processor. Such interfacing elements may e.g. comprise analog to digital converters that convert the received signals into digital data that may be processed by the processor. Such interfacing elements may e.g. be coupled to the processor via a serial or a parallel digital interface.

The data processor may comprise hardware elements, like e.g. a processing unit. However, the data processor may also be software implemented at least in part. The data processor may comprise instructions that cause the data processor perform an encryption or decryption process. The instructions may therefore be stored in a memory that is coupled to a general purpose processor, e.g. via a memory bus. The processor may further execute an operating system that loads and executes the instructions. The processor may e.g. be an Intel processor that runs an operating system that loads and executes the instructions. In another embodiment, the processor may be a processor that may e.g. run an embedded operating system that loads and executes the instructions.

The encryption performed by the data processor may be applied to any kind of data. In particular, the encryption may be performed on a data which are to be transmitted by a wireless transmission channel, especially a wireless transmission channel which is also used for receiving/transmitting the key data. It is understood, that the encrypted data may be transmitted by any number of available transmission channels. For instance, the encrypted data may be divided into parts, and each part of encrypted data is transmitted by one of the available transmission channels. In this case, the data processor may further divide the encrypted data into individual parts. Further, the data processor may allocate the parts of the encrypted data to one of the available transmission paths. However, it is understood, that the encryption of the data and the transmission of the encrypted data is not limited to the above described examples. Moreover, any data of the communication device may be encrypted accordingly.

The data which are encrypted by the data processor may be any kind of data. For instance, the data may refer to an audio signal, in particular to a signal corresponding to speech which received by means of a microphone or another sensor. In this case, the obtained audio signal may be converted into digital data, for instance by an analog to digital converter and further appropriate components such as filters, etc. However, the data may also refer to other digital data, for instance digital data stored in the wireless communication device or data received by a further interface of the communication device, e.g. user interface, an SD card reader, a USB interface, etc. It is understood, that the present invention is not limited to the above-mentioned types of data. Furthermore, any kind of data may be encrypted and transmitted by the wireless communication device.

Accordingly, the communication device may also perform a decryption of any kind of encrypted data based on received encrypted data. For instance, the received encrypted data may relate to an audio signal, in particular a speech signal. In this case, the received signal may be further processed in order to output an analog audio signal after decrypting the data. Further, the received encrypted data may also relate to any other kind of data. For example, the data may comprise digital data, such as data provided from a server, e.g. an Internet server, etc. Accordingly, the data may be provided to a user on a display after decrypting the encrypted data, or the data may be stored in a memory of the communication device. It also possible, that the data may be stored in an encrypted manner and the encrypted data are decrypted based on the received key data upon request at a later time. Further, the data may also comprise control data for controlling the communication device or any other kind of data. However, it is understood, that the present invention is not limited to the above-mentioned data. Furthermore, any other kind of data may be encrypted or decrypted based on the key data transmitted by the plurality of different wireless transmission channels.

Further embodiments of the present invention are subject of the further subclaims and of the following description, referring to the drawings.

In a possible embodiment, the transceiver comprises an antenna system. The antenna system may be adapted to receive the key data from a plurality of different spatial locations. Alternatively, or additionally, the antenna system may be adapted to transmit the key data to a plurality of different spatial locations.

If the key data are exchanged with communication partners at different spatial locations, this makes it more difficult to spoof such a communication system. For example, a communication device may emit wireless signals to more than one different spatial positions, wherein the wireless signals to each of the spatial positions comprise different key data. Accordingly, each spatial position is only aware of the respective key data. For example, the transmitter may comprise an antenna or antenna system which may adapt the direction for emitting wireless signals.

Thus, wireless signals relating to different key data may be emitted to different spatial positions, or may be received from different spatial position. Furthermore, the transmitter may even comprise more than one antenna or antenna system for emitting wireless signals to different spatial positions or receiving wireless signals from different spatial positions. Accordingly, the transmitting or receiving of wireless signals from a plurality of transmission channels may be performed simultaneously or subsequently.

For example, the communication device may be a user equipment, for instance a mobile phone or cellular phone, a communication module of a computer, an Internet of Things (IoT) device, or any other device which may subsequently or synchronously receive or emit wireless signals from/to a plurality of spatial positions. Furthermore, the communication devices may be, for example, a coordinated multipoint architecture comprising a cloud radio access network (C-RAN) with a plurality of remote radio units (RRU) at different spatial positions. In this case, each RRU may be connected to an individual antenna or antenna system. The antenna or antenna system may be, for example, a multiple input multiple output (MINO) antenna, especially a massive MIMO antenna system.

However, it is understood, that the present invention is not limited to the above-mentioned architecture. Moreover, any other communication device for transmitting key data to a plurality of different spatial positions or receiving key data from a plurality of different spatial positions may be also possible.

In a possible embodiment, the data processor is adapted to decrypt the encrypted data based on key data received within a predetermined time period.

By limiting the time period for considering the data of the different spatial transition channels, the security can be further improved. For instance, it may be possible to consider only the data which are received simultaneously or at least simultaneously, i.e. within the small time period. For example, only the data are considered, which are received within a time period of milliseconds, 10 s or 100 s of milliseconds, seconds, or another predetermined time period. If it is not possible to obtain key data from all related wireless transmission channel in such a predetermined time period, the already obtained may be discarded, and it may be necessary to request key data from all related wireless transmission channels again. However, it is understood, that the procedure for obtaining the data, in particular for limiting the time period for obtaining key data may be not limited to the above-mentioned procedure. Any other procedure for considering only key data within a predetermined time period may be possible, too.

For example, it may be also possible to receive the key data periodically. In case that the period between receiving the data exceeds a predetermined threshold, an abnormality can be detected. In this case the remaining key data may be also discarded, and the key data from all related transmission channels may be requested again.

In a possible embodiment, the transceiver is adapted to receive the encrypted data by the plurality of wireless transmission channels. Additionally, or alternatively, the transceiver may be adapted to transmit the encrypted data by the plurality of wireless transmission channels.

Accordingly, the data to be encrypted or decrypted may be transmitted by the same transmission channels used for exchanging the key data. It is understood that the wireless transmission channels are not limited to the transmission of key data and the encrypted data. Moreover, the wireless transmission channels may be also used for transmitting any further data, for instance control data, data for synchronizing the wireless communication devices, or data for any other purposes.

In a possible embodiment, the transceiver is adapted to determine an angle of arrival for each of the received key data. The data processor may be configured to verify whether or not the key data are received for different angles of arrival.

For example, the transceiver may comprise an antenna system comprising a plurality of antenna elements. In this case, the phases of the signals received by the individual antenna elements may be analyzed in order to determine direction from which the signals are received. For this purpose, the signals of the individual antenna elements may be separately forwarded to a further signal processing device, and the further signal processing device may compare the phases of the signals in order to determine an angle of arrival or another parameter for specifying the direction from which a signal is received. However, it is understood, that the present invention is not limited to the above described method for determining an angle of arrival or another parameter for specifying the direction from which a wireless signal is received.

Accordingly, it is possible to verify whether the received signal is emitted from an expected direction or position. By comparing the angle of arrival of with an expected angle of arrival it may be ensured that a received wireless signal is indeed emitted by a communication device at a position (or at least from a direction) where a valid communication device may be expected. Thus, a spoofing communication device which would emit wireless signal from another position can be easily identified. In this way, the security of the communication between communication devices can be enhanced.

For example, it may be possible that the directions or positions for communication devices which may communicate with each other may be stored in advance. For example, the communication device may comprise a memory for storing the respective directions or positions for the wireless transmission channels. However, it may be also possible that the directions or positions for wireless communication channels may be provided during the communication procedure between the communication devices. For example, the positions or directions for a communication channel may be transmitted by the respective communication channel or another communication channel used for wireless communication. It is understood, that any other method for providing information about the relative positions between the communication devices or for determining an angle of arrival may be possible, too.

In a possible embodiment, the transceiver comprises a plurality of transceiving devices adapted to transmit the generated signals. In particular, separate transceiving device may be used for each wireless transmission channel.

By using a plurality of separate transceiving devices, it is possible to arrange the individual transceiving devices at different spatial positions. The individual transceiving devices may be provided with the respective data, in particular the respective key data by central device. Further, the central device may also provide additional data to the transceiving devices, for example encrypted data to be transmitted by transceiving devices.

For instance, such a transceiving device may correspond to remote radio unit and an associated antenna pattern of a coordinated multi-point network arrangement. The respective remote radio unit may be connected with a cloud radio access network in order to provide the respective signals to each of the remote radio units. Especially, the data may be provided by the cloud radio access network to the remote radio units from a key generator. It is understood, that the present invention is not limited to such a configuration according to a coordinated multipoint network comprising the cloud radio access network and a plurality of remote radio units. Moreover, any other configuration comprising a plurality of spatially divided transceiving devices may be possible, too.

In a possible embodiment, each transceiving device comprises an antenna system adapted to emit signals to a predetermined direction and/or to receive signals from a predetermined direction. Each transceiving device may further comprise a signal processor which is adapted to determine the key data based on the received signals and/or to generate signals based on the key data.

As already explained above, the antenna system may comprise a single antenna or antenna system including a plurality of antenna elements. Especially, if the antenna comprises a plurality of antenna elements, the individual antenna elements may be controlled in order to adapt the beamsteering of the antenna. Accordingly, the direction for emitting or receiving wireless signals by such an antenna system may be easily controlled. In this way, the respective signals may be emitted to a predetermined direction at which a communication partner is expected. Furthermore, the reception of wireless signals can be limited to communication partners in the respective directions. It is understood, that any other kind of configuration for the antenna system may be possible in order to control the direction for emitting and/or receiving wireless signals.

The signal processor may be any kind of processor which is appropriate for determining the key data—and if applicable any further data—from the signals received by the antenna system. Furthermore, the signal processor may generate signals based on provided key data—and if applicable any further data—to generate signals which may be provided to the antenna system. For example, the signal processor may e.g. comprise a general purpose processor with corresponding instructions. Further, the signal processor may comprise interfacing elements that are coupled to the processor, receive the data from the transceiver and provide the received data to the processor. Such interfacing elements may e.g. comprise analog to digital converters that convert the received signals into digital data that may be processed by the processor, or digital to analog converters convert digital data in two analog signals which may be provided to further components of the signal processor or which may be forwarded to the antenna system.

The signal processor may comprise hardware elements, like e.g. a processing unit. However, the signal processor may also be software implemented at least in part. The signal processor may comprise instructions that cause the signal processor perform the respective generation of signals or data. The instructions may therefore be stored in a memory that is coupled to a general purpose processor, e.g. via a memory bus. The processor may further execute an operating system that loads and executes the instructions. The processor may e.g. be an Intel processor that runs an operating system that loads and executes the instructions. In another embodiment, the processor may be a processor that may e.g. run an embedded operating system that loads and executes the instructions.

In a possible embodiment, the signal processor is adapted to determine the predetermined direction for each key data separately.

Accordingly, it is possible to transmit the key data between communication partners by separate transmission channels in which at least one communication partner comprises a plurality of spatially divided reception positions.

In a possible embodiment, each transceiving device is located at a different spatial position. Especially, the plurality of transceiving devices may be communicatively coupled.

As already mentioned above, the individual transceiving devices may be spatially divided remote radio units with a connected antenna system for emitting wireless signals. The individual remote radio units may be connected by a common cloud radio access network for providing each of the remote radio units with the respective signals, in particular with the respective key data—and if applicable, the respective further data which are to be transmitted by the wireless transmission channels.

In a possible embodiment, the wireless communication device comprises a key generator adapted to generate an encryption key and determining a plurality of key data based on the generated encryption key, wherein each of the plurality of key data is transmitted by one of the wireless transmission channels.

In a possible embodiment, the wireless communication device comprises a plurality of key generators. Each key generator may be adapted to generate key data. Each of the key generators may generate the key data which are transmitted by one of wireless transmission channels.

For example, each key generator may be realized by separate hardware. Accordingly, each hardware may generate separate key data independently. For example, separate processors for computing the key data may be applied.

Alternatively, a plurality of key generators may be also realized by a common hardware. Accordingly, a plurality of key data, or even all key data may be generated by separate key generators on the common hardware structure. In particular, a plurality of virtual machines may be installed on a hardware structure, wherein each virtual machine generates its key data separately.

It is understood, that are respectively the key data are generated by a single key generator or a plurality of key generators. The key generator may comprise hardware elements, like e.g. a processing unit. However, the key generator may also be software implemented at least in part. The key generator may comprise instructions that cause the key generator perform the respective generation of signals or data. The instructions may therefore be stored in a memory that is coupled to a general purpose processor, e.g. via a memory bus. The processor may further execute an operating system that loads and executes the instructions. The processor may e.g. be an Intel processor that runs an operating system that loads and executes the instructions. In another embodiment, the processor may be a processor that may e.g. run an embedded operating system that loads and executes the instructions.

In a possible embodiment, the wireless communication device may comprise a device of a wireless communication network, in particular a device of a coordinated multi-point architecture. For example, the wireless communication device may be a user equipment such as the mobile phone or a cellular phone, tablet computer, a communication module for a computer, an Internet of things (IoT) device or any other mobile communication device. Further, the wireless communication device may also be a base station, an Evolved Node B (eNodeN, eNB), or any other wireless communication device in a mobile communication network.

With the present invention it is therefore possible to ensure a secure communication between wireless communication devices. By applying more than one wireless transmission channel and exchanging different key data by each of the wireless transmission channels, the security of the communication can be enhanced, when all key data are considered for encrypting and decrypting the communication data. Accordingly, the communication cannot be infringed by installing single spoofing communication device.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

Figure 1:
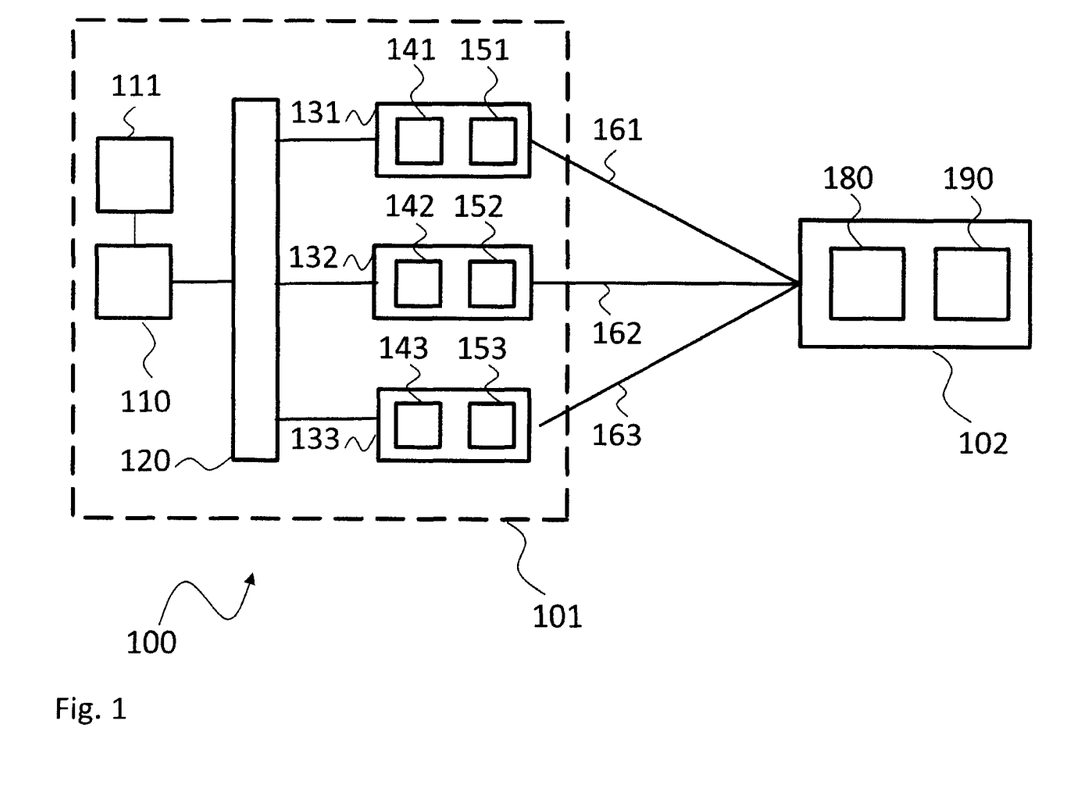
FIG. 1 shows a block diagram of an embodiment of a wireless communication system.

FIG. 1 shows a block diagram of an embodiment of a wireless communication system 100. The wireless communication 100 comprises at least a first wireless communication device 101 and at least one second wireless communication device 102. However, it is understood, that the wireless communication device 100 may comprise any number, i.e. one or more than one, first wireless communication devices 101 and any number of second wireless communication devices 102. The first wireless communication device 101 and the second wireless communication device 102 are connected by a plurality of wireless transmission channels 161, 162, 163. Accordingly, the first wireless communication device 101 may comprise a plurality of first transceivers 131, 132, 133 which are wirelessly connected with at least one second transceiver 180 of the second wireless communication device 102. It is understood, that although a number of three wireless transmission channels 161, 162, 163 are exemplarily shown, the wireless communication system 100 may comprise any number, i.e. two or more, wireless transmission channels.

Accordingly, for each wireless transmission channel 161, 160, 163, a separate first transceivers 131, 132, 133 may be provided.

Each first transceiver 131, 132, 133 may comprise a signal processor 141, 142, 143 and an antenna system 151, 152, 153. Accordingly, the signal processor 141, 142, 143 may receive digital data and generate a signal based on the received digital data. For example, the signal processor 141, 142, 143 may modulate a radio frequency signal based on the received digital data. Even though not shown, the signal processor 141, 142, 143 may comprise an interface for receiving digital data and further components such as digital to analog converter, analog to digital converter, mixer, amplifier, filter, frequency generator, etc. for generating a modulated signal based on the received digital data. Further, the signal processor 141, 142, 143 may comprise connector which is electrically coupled with a connector of the antenna system 151, 152, 153, respectively. Accordingly, the signals generated by the signal processor 141, 142, 143 may be emitted by the connected antenna system 151, 152, 153. The antenna system 151, 152, 153 may be any kind of appropriate antenna system. For example, the antenna system 151, 152, 153 may comprise a plurality of antenna elements which are individually controlled in order to control the beam pattern of the respective antenna system 151, 152, 153.

Furthermore, the antenna system 151, 152, 153 may receive wireless signals, respectively. The received wireless signals may be provided to the respective connected signal processor 141, 142, 143. In this case, the signal processor 141, 142, 143 may process the received signals in order to obtain digital data included in the received signals. For example, the signal processor 141, 142, 143 may demodulate the received signals in order to obtain the data included in the signals. The obtained data may be output to the data processor 110 or any other device, for instance by a serial or parallel interface.

Accordingly, the second wireless communication device 102 may comprise a second transceiver 180 and second data processor 190. The second transceiver 180 may receive wireless signals by the wireless transmission channels 161, 162, 163. In particular, the second transceiver 180 may receive the wireless signals by the plurality of wireless transmission channels 161, 162, 163 simultaneously or subsequently. It is understood, that the present invention is not limited to a particular manner for receiving the wireless signals by the plurality of wireless transmission channels 161, 162, 163. For example, the wireless signals may be transmitted by the plurality of communication channels 161, 162, 163 in a time multiplex manner.

However, the present invention is not limited to such a time multiplexed transmission/reception of signals.

The first wireless is communication device 101 may correspond to a coordinated multipoint (CoMP) architecture. In this case, each transceiver 131, 132, 133 may relate to a remote radio unit (RRU) and the related antenna system. The RRUs and the further components of the CoMP may be connected with each other, for instance by a cloud radio access network (C-RAN). The second wireless communication device 102 may relate to user equipment, for instance a mobile phone or a cellular phone. However, it is understood, that the present invention is not limited to the configuration of the CoMP architecture and related user equipment. Moreover, the present invention may be also applied to any other configuration of a wireless communication system comprising wireless communication devices which are connected by a plurality of wireless transmission channels 161, 162, 163.

In order to establish a secure communication between the first wireless communication device 101 and the second wireless communication device 102, the data included in the wireless signals transmitted by the wireless transmission channels 161, 162, 163 may be encrypted. It is for this purpose, that the first wireless communication device 101 and the second wireless communication device 102 require the respective keys for decrypting and encrypting the respective data. The encryption and decryption of the data may be performed, for example, in the data processors 110, 190.

Accordingly, the required key data have to be provided in advance. In the following, the process for providing a key data from one wireless communication device 101, 102 to the other wireless communication device 101, 102 will be described. Even though the process for providing key data may be possible in both direction, i.e. from the first wireless communication device 101 to the second wireless communication device 102 or for the second wireless communication device 102 to the first wireless communication device 101, the following only the procedure for generating the key data by the first wireless communication device 101 and providing the respective key data to the second wireless committee device 102 will be described.

For generating the respective key data, the first wireless communication device 101 may comprise a key generator 111. Accordingly, the key generator 111 may generate the required data for performing the encrypting and decrypting of the data to be transmitted between the first wireless communication device 101 and the second wireless communication device 102. It is understood, that the present invention is not limited to a particular scheme for performing the encryption or decryption. Moreover, any appropriate encryption may be applicable. In particular, the encryption may be based on the encryption scheme are defined in the LTE standard. Even though not limited to a particular encryption algorithm, for instance algorithms like an evolved packet system (EPS) encryption algorithm or EPS integrity algorithm may be applied. For example, 128 bit EPS encryption algorithm may be applied. However, it is understood, the present invention is not limited to a particular encryption algorithm. Moreover, any appropriate encryption algorithm may be applied. Accordingly, key generator 111 may generate the required key data for the respective encryption algorithm which is applied for the encrypted communication between the first wireless communication device 101 and the second wireless communication device 102. For example, the key generator 101 may generate a single key which is used for an encrypted communication between the first wireless communication device 101 and the second wireless communication device 102. In this case, the generated key may be divided into a plurality of partial keys. In particular, the number of partial keys may correspond to the number of wireless transmission channels 161, 162, 163 between the first wireless communication device 101 and the second wireless communication device 102. Accordingly, the key data relating to each of the partial keys may be transmitted from the first wireless communication device 101 to the second wireless communication device 102 by the wireless transmission channels 161, 162, 163. The key generator 111 may provide the data of each of the respective partial keys to one of the first transceivers 131, 132, 133. The key generator 111 may be communicatively coupled with the first transceivers 131, 132, 133 by communication links of network 120. As already mentioned above, the network 120 may be a C-RAN. However, it is understood, that the present invention is not limited to the communication between key generator 111 and the first transceivers of 131, 132, 133 by a C-RAN. Moreover any appropriate communication network 120 may be applicable.

In order to increase the security, the first transceivers 131, 132, 133 may be located at different spatial positions. As already mentioned above, the transceivers 131, 132, 133 may be RRUs which are located at different positions. Accordingly, the wireless transmission channels 161, 162, 163 between the first transceivers 131, 132, 133 and the second transceiver 180 may have different spatial directions. Thus, the key data relating to the individual partial keys generated by the key generator 111 are provided to the second wireless communication device 102 by a plurality of independent wireless transmission channels 161, 162, 163.

The second wireless communication device 102 receives the key data relating to the individual partial keys generated by key generator 111. Thus, the second data processor 190 of the second wireless communication device 102 may combine the received key data in order to obtain the complete key for decrypting the encrypted data or encrypting data. Thus, only if the second wireless communication device 102 receives all the partial keys from the plurality of different wireless transmission channels 161, 162, 163, the second data processor 190 of the second wireless device 102 is in the position to encrypt/decrypt the data between the first wireless communication device 101 and the second wireless communication device 102.

It is understood, that the above described procedure for transmitting key data by a plurality of independent wireless transmission channels 161, 162, 163 is not limited to only a single key generated by key generator 111. Moreover, key generator 111 may also generate a plurality of independent keys, wherein at least one of the plurality of independent keys may be transmitted by each of the wireless transmission channels 161, 162, 163. In this case, it may be possible to apply a plurality of nested encryptions for encrypting the data, wherein each of the plurality of encryptions uses one of the generated keys. Furthermore, it may also possible to compute a "master key" based on the plurality of generated keys and apply this master key for encrypting the data. However, it is understood, that the generation of keys, partial keys and key data transmitted by each of the plurality of wireless transmission channels 161, 162, 163 is not limited to the above described examples. Moreover, any other way for generating separate key data which may be transmitted by the plurality of wireless transmission channels 161, 162, 163 may be possible, too.

Furthermore, the generation of the key data which are transmitted by each of the wireless transmission channels 161, 162, 163 it is not limited to a single key generator 111. Furthermore, it may be also possible to generate the key data which are transmitted by one of the plurality of wireless transmission channels 161, 162, 163 by a plurality of key generators 111. For this purpose, e.g. key data transmitted by one of the plurality of wireless transmission channels 161, 162, 163 may be generated by separate key generators 111. For example, each of the plurality of separate key generators 111 may be applied by a separate independent hardware. However, it may also possible to use a common hardware and apply a plurality of virtual machines on a single hardware in order to realise a plurality of key generators 111. If a plurality of separate key generators 111 are used for generating the key data, each of the key generators 111 may be communicatively coupled with one of the plurality of first transceivers 131, 132, 133. However, it is understood, that the present invention is not limited to the above-described examples for generating a key data and/or for the communication between the key generators 111 and the respective first transceivers 131, 132, 133.

As already mentioned above, the second wireless communication device 102 can only perform decryption or encryption if all key data received by each of the plurality of wireless transmission channels 131, 132, 133 are considered for performing the respective decryption/encryption process by the second data processor 190.

In order to further increase security of the wireless communication between the first wireless communication device 101 and the second wireless communication device 102, the direction for emitting wireless signals and the direction for receiving wireless signals by the respective wireless transmission channels 161, 162, 163 may be further taken into account.

For example, the first wireless communication device 101 may determine the spatial position of the second wireless communication device 102. For example, the first wireless communication device 101 may receive data from the second wireless communication device 102 relating to the position of the second wireless communication device 102. The position of the second wireless convocation device may be determined, for example, by a position determining device (not shown) of the second wireless communication device 102. Such a position determining device may be, for example, a global positioning system (GPS) module or any other appropriate device for determining a spatial position of the second wireless communication device 102. It is understood, that the position of the second wireless communication device 102 may be also determined by any other appropriate device or algorithm. For example, the position of the second wireless communication device 102 may be determined based on a triangulation algorithm. Such a triangulation algorithm may consider the orientations of the second wireless communication device 102 with respect to further objects in the surrounding of the second wireless communication device 102. Especially, the second wireless communication device 102 may determine its position with respect to the first transceivers 131, 132, 133. However, as already mentioned above, any other method for determining the position of the second wireless communication device 102 may be possible, too.

Furthermore, the first wireless communication device 101 may monitor the movement of the second wireless communication device 102 in order to determine the current position of the second wireless communication device 102.

Accordingly, the first transceivers 131, 132, 133 may adapt a characteristics of an antenna beam of the antenna system 151, 152, 153 in order to emit wireless signals in direction of the second wireless communication device 102 or receive wireless signals from the direction of the second wireless communication device 102.

The second wireless communication device 102 may also consider the spatial orientation of the second wireless communication device 102 with respect to the first transceivers 131, 132, 133 of the first wireless communication device 101. For example, the second wireless communication device 102 may determine for each wireless transmission channel 161, 162, 163 an angle of arrival of the wireless signals transmitted by the respective wireless transmission channel 161, 162, 163. In this case, the second wireless communication device 102 may verify, whether the angles of arrival for each wireless transmission channel 161, 162, 163 are different. If at least some of the wireless transmission channels 161, 162, 163 have a same angle of arrival, the respective key data received by these wireless transmission channels 161, 162, 163 may be discarded, since these wireless transmission channels 161, 162, 163 may be considered as not independent. In this way, it can be ensured, that a plurality of independent wireless transmission channels 161, 162, 163 are used. In particular it may be ensured that the key data are transmitted from the first wireless communication device 101 to the second wireless communication device 102 from different spatial positions. It is understood, that the present invention is not limited to the case where all angles of arrival have to be different from each other. Furthermore, it may be also possible to accept the received key data is at least a predetermined number, for instance at least two, of angles of arrival at different from each other.

Furthermore, the second wireless communication device 102 may determine its station position with respect to the spatial positions of the first transceivers 131, 132, 133 of the first wireless communication device 101. For example, the second wireless communication device 102 may determine its position as already described above. Furthermore, the first wireless communication device may determine the positions or at least the directions of the first transceivers 131, 132, 133 with respect to the second wireless communication device 102. For example, the second wireless communication device 102 may monitor the movement of the second wireless communication device 102 and determine the expected position of the first transceivers 131, 132, 133 with respect to the second wireless communication device 102 based on the monitored movement. For example, the data of a position determining device such as a GPS of the second wireless communication device may be used for determining the position and the movement of the second wireless communication device 102. However, this understood, that any further device or method for determining the position of the second wireless convocation device and/or the relative positions of the first transceivers 131, 132, 133 may be possible, too. Based on these data, the second wireless communication device 102 may determine for each wireless transmission channel 161, 162, 163 an expected direction for receiving wireless signals from the respective first transceivers 131, 132, 133.

Accordingly, the second wireless communication device 102 may determine an expected direction for each wireless transmission channel 161, 162, 163. Thus, the second wireless communication device 102 may compare for each wireless transmission channel 161, 162, 163 a current angle of arrival for the respective wireless signals with the expected angle of arrival. If the expected angle of arrival does not match the current angle of arrival, the key data received by the respective wireless transmission channel 161, 162, 163 may be discarded.

The encryption or decryption of data is only carried out, if key data between the first wireless communication device and the second wireless communication device are transmitted by at least two independent wireless transmission channels. In this way, the security for the encrypted communication between the first and the second wireless communication devices 101, 102 can be enhanced.

It is understood, that the encryption and decryption in the first wireless communication device 101 and the second wireless communication device 102 may be applied to any kind of data. For example, the second wireless communication device 102 may be a mobile phone or cellular phone. In this case, an audio signal, for example a speech signal may be obtained by the second wireless communication device 102 and this signal may be converted into digital data. Accordingly, the digital data relating to the audio signal may be encrypted based on the respective key data received by the plurality of wireless transmission channels 161, 162, 163. However, the present invention is not limited to speech or an audio signal. Furthermore, any kind of data, in particular any kind of digital data may be encrypted or decrypted by the first wireless communication device 101 and the second wireless communication device 102 of the wireless communication system 100.

It is understood, that the encrypted data may be transmitted by the same wireless transmission channels 161, 162, 163 which are used for transmitting the key data. In particular, a plurality of wireless transmission channels 161, 162, 163 may be used for simultaneous transmission of data by a plurality of wireless transmission channels 161, 162, 163. However, it is understood, that any further transmission of the encrypted data may be possible, too.

Figure 2:
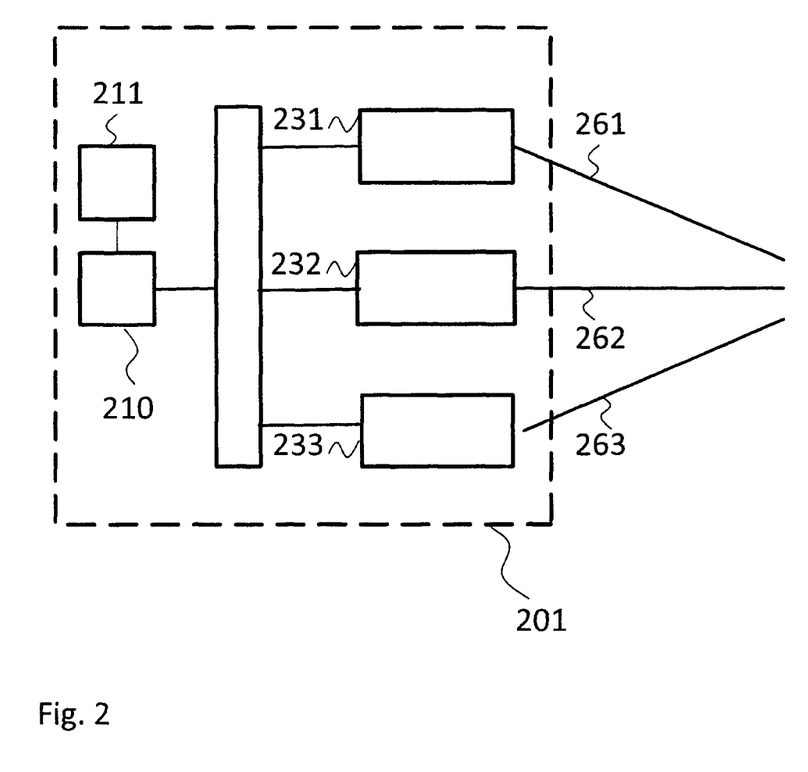
FIG. 2 shows a block diagram of an embodiment of wireless communication device.

FIG. 2 shows a block diagram of a wireless communication device 201. The wireless communication device 201 is based on the first wireless communication device 101 as described above. Therefore, the wireless communication device 201 also comprises a key generator 211, and data processor 210 and plurality of transceivers 231, 232, 233.

As already described above, key generator 211 may generate a single key which is divided into a plurality of partial keys. In this case, each transceiver 231, 232, 233 may be provided with the key data relating to one partial key, and the respective key data are transmitted by the wireless transmission channel 261, 262, 263. However, it is understood, that all other approaches for generating key data and transmitting the key data by a plurality of the wireless transmission channels 261, 262, 263 may be applicable, too. Accordingly, data processor 210 can perform an encryption or decryption based on a combination of the key data transmitted by all of the wireless transmission channel 261, 262, 263. In particular, each of the plurality of transceivers 231, 232, 233 may be located at different spatial positions.

Figure 3:
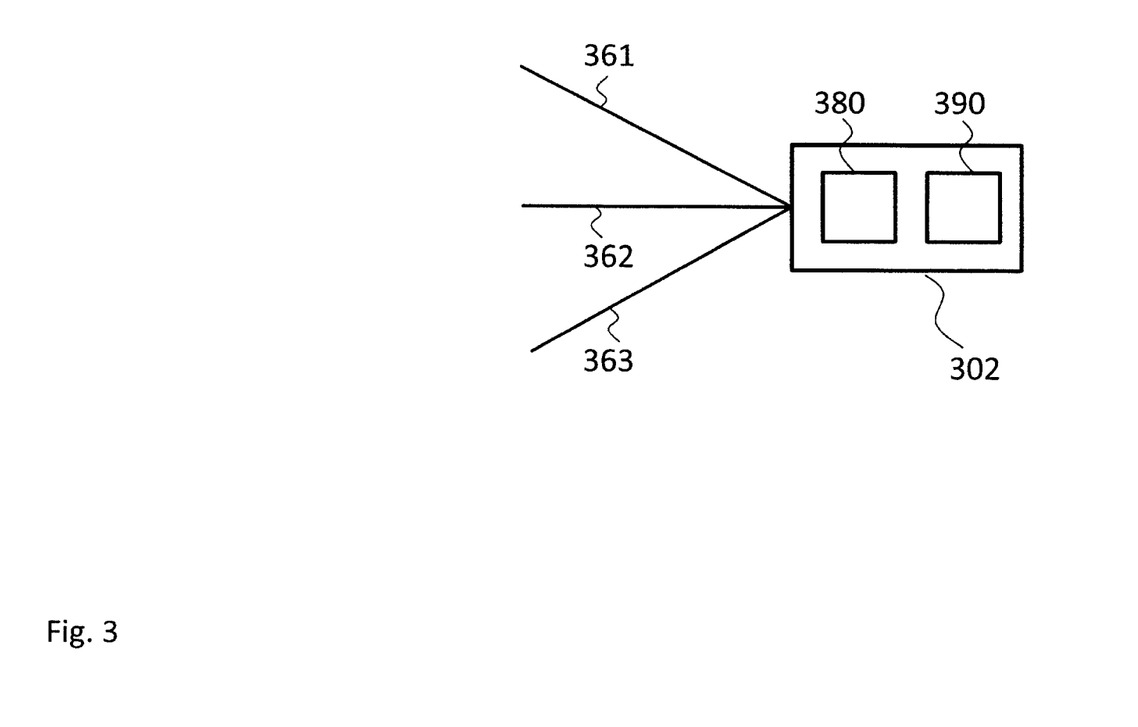
FIG. 3 shows a block diagram of another embodiment of a wireless communication device.

FIG. 3 shows a block diagram of a wireless communication device 301. The wireless communication device 302 is based on the second wireless communication device 102 as described above. Therefore, the wireless communication device 302 also comprises transceiver 380 and a data processor 390.

As already mentioned above, the transceiver 380 may receive key data by a plurality of wireless transmission channels 361, 362, 363. Accordingly, only if the wireless communication devices 302 receives all the key data by the plurality of wireless transmission channels 361, 362, 363, the data processor 390 of the wireless communication device 302 may perform an encryption or decryption of data. In particular, the data processor 390 may perform an encryption of data and subsequently the data may be transmitted by one or more of the wireless transmission channels 361, 362, 363. Furthermore, the data processor may perform a decryption of encrypted data which are received by one or more of the wireless transmission channel 361, 362, 363.

As also mentioned above, the wireless communication device 302 may determine an angle of arrival for each wireless transmission channel 361, 362, 363. In this case, the wireless communication device 302 may verify, whether the wireless transmission channels relate to different angles of arrival. In this case, the wireless communication device 302 may accept the received key data only if the wireless transmission channels relate to different angles of arrival. Otherwise, the received data may be discarded.

Furthermore, the wireless communication devices 302 may compare the current angles of arrival for a wireless transmission channel with an expected angle of arrival. In this case, the received key data are only accepted, if the current angle of arrival matches an expected angle of arrival.

For sake of clarity in the following description of the method based FIGS. 4 and 5 the reference signs used above in the description of apparatus based FIGS. 1-3 will be maintained.

Figure 4:
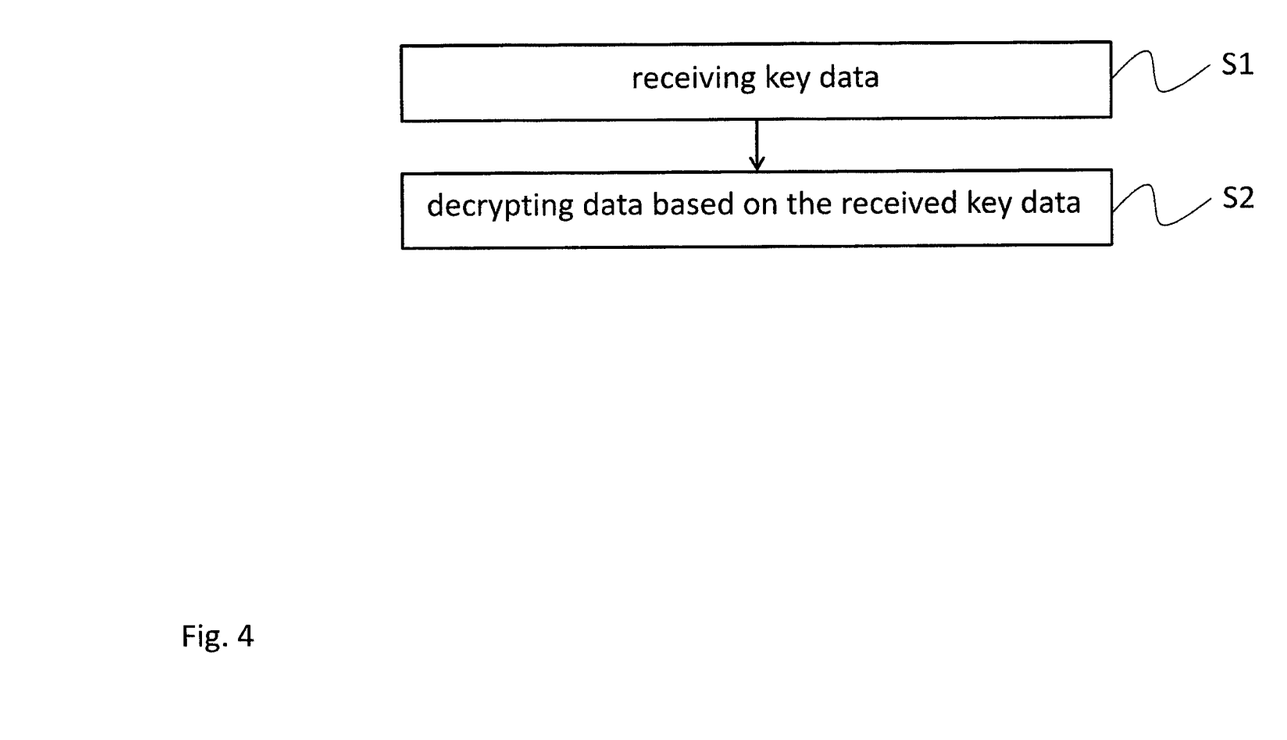
FIG. 4 shows a flow diagram of an embodiment of the communication method.

FIG. 4 shows a flow diagram of a wireless communication method. The wireless communication method receives in step S1 key data by a plurality of wireless transmission channels 161, 162, 163; 261, 262, 263; 361, 362, 363. Based on a combination of the key data received by the plurality of wireless transmission channels 161, 162, 163; 261, 262, 263; 361, 362, 363, the method is decrypting encrypted data in step S2. It is understood, that any further method step as described above in connection with the wireless communication devices may be applicable, too.

Figure 5:
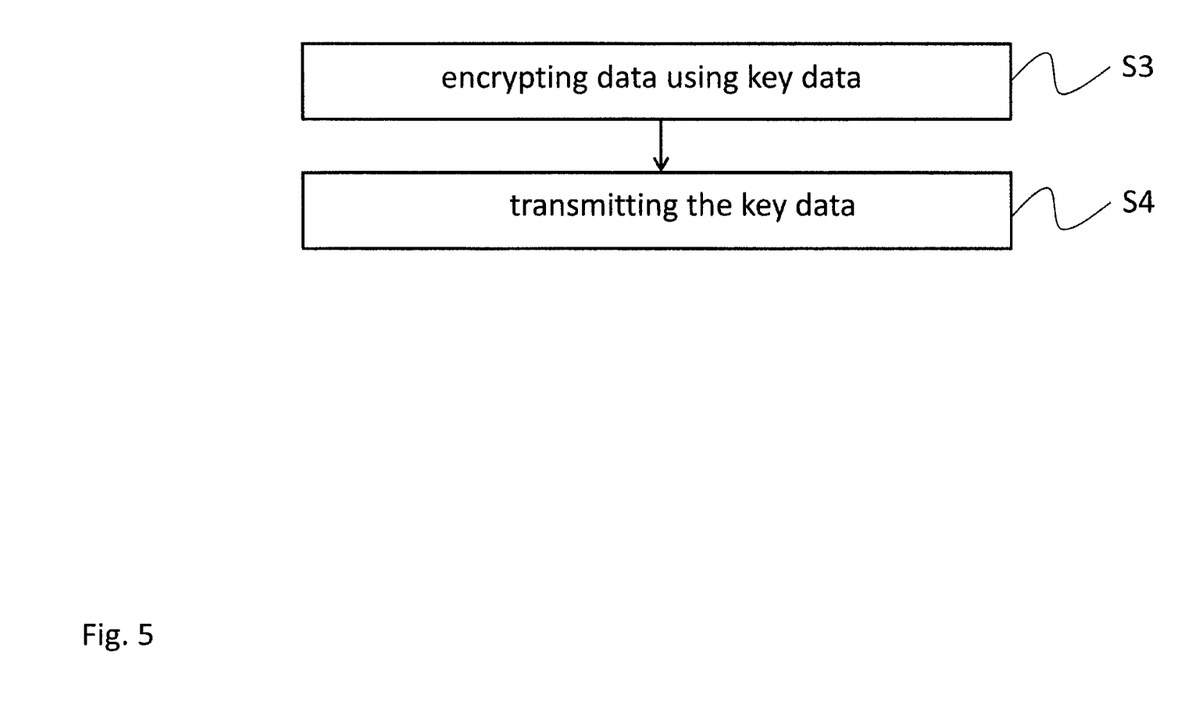
FIG. 5 shows a flow diagram of an embodiment of a further communication method.

FIG. 5 shows a flow diagram of a further wireless communication method. The wireless communication method encrypts in step S3 data based on a plurality of key data. In step S4 each of the plurality of key data is transmitted by a one of a plurality of wireless transmission channels 161, 162, 163; 261, 262, 263; 361, 362, 363. It is also understood, that any further method step as de-scribed above in connection with the wireless communication devices may be applicable, too.

Summarizing, the present invention relates to a wireless communication system using encrypted communication. In particular, the present invention provides a transmission of key data for encrypting or decrypting data by a plurality of independent wireless transmission channels. Accordingly, encryption or decryption is performed by a combination of the key data transmitted by a plurality of the wireless transmission channels.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF USED REFERENCE SIGNS 100 wireless communication system
101, 102, 201, 302 wireless communication device
110, 190, 210, 390 data processor
111, 211 key generator
120 network
131, 131, 131, 180 transceivers
231, 232, 232, 380 transceivers
141, 142, 143 signal processor
151, 152, 153 antenna system
161, 162, 163 wireless transmission channels
261, 262, 263 wireless transmission channels
361, 362, 363 wireless transmission channels
S1, S2, S3, S4 method steps

I claim:

1. A wireless communication device, the wireless communication device comprising: a transceiver adapted to receive key data by a plurality of wireless transmission channels and adapted to transmit key data by a plurality of wireless transmission channels; and a data processor adapted to decrypt encrypted data based on a combination of the key data received by the plurality of wireless transmission channels and adapted to encrypt data based on a combination of the key data transmitted by the plurality of wireless transmission channels; wherein the transceiver is adapted to determine an angle of arrival for each of the received key data, and wherein the data processor is configured to verify whether or not the key data are received by different angles of arrival.

2. The wireless communication device of claim 1, wherein the transceiver comprises an antenna system adapted to receive the key data from a plurality of different spatial locations and/or adapted to transmit the key data to a plurality of different spatial locations.

3. The wireless communication device of claim 1, wherein the data processor is adapted to decrypt the encrypted data based on key data received within a predetermined time period.

4. The wireless communication device of claim 1, wherein the transceiver is adapted to receive and/or transmit the encrypted data by the plurality of wireless transmission channels.

5. The wireless communication device of claim 1, wherein the transceiver comprises a number of transceiving devices adapted to transmit the generated signals, and wherein a separate transceiving device is used for each wireless transmission channel.

6. The wireless communication device of claim 5, wherein each transceiving device comprises: an antenna system adapted to emit signals to a predetermined direction and/or adapted to receive signals from a predetermined direction; and a signal processor adapted to determine the key data based on the received signals and/or adapted to generate signals based on the key data.

7. The wireless communication device of claim 6, wherein the signal processor is adapted to determine the predetermined direction for each key data separately.

8. The wireless communication device of claim 7, wherein each transceiving device is located at a different spatial position.

9. The wireless communication device of claim 1, comprising a key generator adapted to generate an encryption key and determining a plurality of key data based on the generated encryption key, wherein each of the plurality of key data is transmitted by one of the wireless transmission channels.

10. The wireless communication device of claim 1, further comprising a plurality of key generators adapted to generate key data, wherein each of the key generators generates key data which are transmitted by one of wireless transmission channels.

11. The wireless communication device of claim 1, wherein the wireless communication device comprises a user equipment, a base station or an evolved node B device.

12. A wireless communication system, the wireless communication system comprising: a first wireless communication device comprising a first transceiver adapted to receive key data by a plurality of wireless transmission channels, and a first data processor adapted to decrypt encrypted data based on a combination of the key data received by the plurality of wireless transmission channels; and a second wireless communication device comprising a second data processor adapted to encrypt data using a plurality of key data, and a second transceiver adapted to transmit each of the plurality of key data by one of a plurality of wireless transmission channels; wherein the transceiver is adapted to determine an angle of arrival for each of the received key data, and wherein the data processor is configured to verify whether or not the key data are received by different angles of arrival.

* * * * *